(12) United States Patent
Min et al.

(10) Patent No.: US 9,182,624 B2
(45) Date of Patent: Nov. 10, 2015

(54) LIQUID CRYSTAL CELL

(71) Applicant: LG CHEM, LTD., Seoul (KR)

(72) Inventors: Sung Joon Min, Daejeon (KR); Dong Hyun Oh, Daejeon (KR); Jun Won Chang, Daejeon (KR); Kyung Jun Kim, Daejeon (KR); Hye Won Jeong, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/298,570

(22) Filed: Jun. 6, 2014

(65) Prior Publication Data

US 2014/0285751 A1  Sep. 25, 2014

Related U.S. Application Data

(63) Continuation of application No. PCT/KR2012/010571, filed on Dec. 6, 2012.

(30) Foreign Application Priority Data

Dec. 6, 2011 (KR) .......................... 10-2011-0129655
Dec. 6, 2012 (KR) .......................... 10-2012-0141351

(51) Int. Cl.
*G02F 1/1333* (2006.01)
*G02F 1/1334* (2006.01)
*C09K 19/60* (2006.01)
*G02F 1/137* (2006.01)
*C09K 19/04* (2006.01)
*C09K 19/20* (2006.01)
*C09K 19/54* (2006.01)

(52) U.S. Cl.
CPC .............. *G02F 1/1334* (2013.01); *C09K 19/60* (2013.01); *G02F 1/13725* (2013.01); *C09K 2019/0448* (2013.01); *C09K 2019/2078* (2013.01); *C09K 2019/546* (2013.01); *G02F 2001/13345* (2013.01)

(58) Field of Classification Search
USPC ............................................. 349/186, 86–92
See application file for complete search history.

(56) References Cited

U.S. PATENT DOCUMENTS 4,550,980 A * 11/1985 Shingu ........................ 349/186
5,327,271 A *  7/1994 Takeuchi et al. ............... 349/88
8,488,089 B2 * 7/2013 Utsumi et al. ................. 349/117

(Continued)

FOREIGN PATENT DOCUMENTS

EP         359146 A2 *  3/1990 ............ C09K 19/02
JP       05-119320 A     5/1993

(Continued)

OTHER PUBLICATIONS

International Search Report issued in International Application No. PCT/KR2012/010571 on Feb. 26, 2013, 2 pages.
Office Action issued in Taiwanese Patent Application No. 101146052 on Sep. 15, 2015 along with English translation, 15 pages.

*Primary Examiner* — Hoan C Nguyen
(74) *Attorney, Agent, or Firm* — Rothwell, Figg, Ernst & Manbeck, P.C.

(57) ABSTRACT

The present application relates to a liquid crystal cell, a method for preparing a liquid crystal cell and a display device. An exemplary liquid crystal cell may be applied to various types of display devices so as to control a viewing angle or light transmittance of the display device.

18 Claims, 9 Drawing Sheets

(56) References Cited

U.S. PATENT DOCUMENTS

| | | |
|---|---|---|
| 2005/0206809 A1 | 9/2005 | Kim et al. |
| 2005/0270411 A1* | 12/2005 | Kawabata et al. ............ 348/362 |
| 2007/0024970 A1* | 2/2007 | Lub et al. ...................... 359/487 |
| 2007/0195244 A1* | 8/2007 | Miyatake et al. ............ 349/118 |
| 2010/0060825 A1 | 3/2010 | Jang et al. |
| 2011/0067807 A1 | 3/2011 | Hwang et al. |
| 2013/0044280 A1* | 2/2013 | Asaoka et al. .................. 349/70 |

FOREIGN PATENT DOCUMENTS

| | | |
|---|---|---|
| JP | 5-119320 A | 5/1993 |
| JP | 2005266744 A | 9/2005 |
| JP | 2007334344 A | 12/2007 |
| KR | 10-1998-077397 A | 11/1998 |
| KR | 10-2005-0094011 A | 9/2005 |
| KR | 10-2010-0029633 A | 3/2010 |
| KR | 10-2011-0032639 A | 3/2011 |

* cited by examiner

LIQUID CRYSTAL CELL

CROSS-REFERENCE TO RELATED APPLICATION

This application is a continuation of International Application PCT/KR2012/010571, with an international filing date of Dec. 6, 2012, which claims priority to and the benefit of Korean Patent Application No. 10-2011-0129655, filed Dec. 6, 2011 and Korean Patent Application No. 10-2012-0141351, filed Dec. 6, 2012, the disclosures of which are incorporated herein by reference in their entireties.

TECHNICAL FIELD

The present application relates to a liquid crystal cell, a method of manufacturing a liquid crystal cell and a display device.

BACKGROUND

Recent display technology requires a larger or smaller display to be larger or smaller to be used in mobile devices or tablet PCs.

Displays are generally applied in the form of mobile devices or tablet PCs regardless of places, and thus display technology capable of protecting privacy is needed. Conventionally, as technology used to protect privacy, a narrow viewing angle film is used. For example, a display may be usually used at a wide viewing angle, or may be covered on a screen to be used at a narrow viewing angle when protection of privacy is needed. In addition, for example, technology capable of switching a cell installed in a display, such as an ECB cell produced by Sharp or a HAN cell produced by Hitachi, from a wide viewing angle to a narrow viewing angle is also known. An LCD having two different viewing angles, to which viewing angle image control (so called, "VIC") technology is applied, is also known (ex. the patent documents 1 and 2)

PRIOR ART DOCUMENT

Patent Document 1: Korean Laid-Open Patent No. 2011-0123538
Patent Document 2: Korean Laid-Open Patent No. 2011-0078785

DETAILED DESCRIPTION

Technical Object

The present application relates to a liquid crystal cell, a method of manufacturing a liquid crystal cell and a display device.

Technical Solution

Illustrative liquid crystal cell may include a polymer network and a region in the network. The region (hereinafter, referred to as a "liquid crystal region") may include a liquid crystal compound and a dichroic dye. The liquid crystal region may be dispersed in the network.

The liquid crystal cell may, for example, control a viewing angle or light transmittance when a display element displays an image. The display element may include, for example, a display panel and a polarizing plate. As a display panel, regardless of a kind, for example, an organic light emitting diode (OLED) panel or a liquid crystal panel such as an in-plane switching (IPS) liquid crystal panel, a vertical alignment (VA) liquid crystal panel or a twisted nematic (TN) liquid crystal panel may be used, but is not limited thereto.

The liquid crystal cell may be disposed on one surface of the display element, for example, at the outmost side of a display device. In this case, the liquid crystal cell may be disposed to such an extent that at least one polarizing plates in the display element is between the display panel and the liquid crystal cell. For example, as shown in FIG. 1, a display device may include a liquid crystal cell 101, a polarizing plate 102 and a display panel 103, which are sequentially stacked. The liquid crystal cell may control a viewing angle or light transmittance of the display device in the above structure. For example, as alignment of the liquid crystal compound and/or the dichroic dye in the liquid crystal region is/are controlled according to a kind of the display panel, the viewing angle and/or light transmittance may be controlled.

For example, when the display panel is an in-plane switching (IPS)-mode panel, the liquid crystal compound and/or the dichroic dye in the liquid crystal region of the liquid crystal cell may be convertable between a homogeneous alignment state and a homeotropic alignment state so as to control the viewing angle and/or light transmittance. Here, the homogeneous alignment and the homeotropic alignment refer to substantially homogeneous and homeotropic alignment in which a desired viewing angle or light transmittance is able to be controlled. For example, as long as the viewing angle or light transmittance can be suitably controlled, the homogenous alignment state may have a thickness-direction retardation ($R_{th}$), which will be described below, in a certain range, and the homeotropic alignment state may have an in-plane retardation ($R_{in}$) in a certain range. For example, when a voltage is not applied to the liquid crystal cell, the liquid crystal compound and/or the dichroic dye may be homogeneously aligned, for example, in a direction substantially parallel to a light absorption axis of one of the polarizing plates of the display element between the display panel and the liquid crystal cell, and when a voltage is applied, the liquid crystal compound and/or the dichroic dye may be homeotropically aligned.

When the liquid crystal compound and/or the dichroic dye in the liquid crystal cell is homogeneously aligned, the in-plane retardation ($R_{in}$) of the liquid crystal cell may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more or 140 nm or more. In addition, when a voltage is not applied, the in-plane retardation ($R_{in}$) of the liquid crystal cell may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less or 160 nm or less. In addition, when the liquid crystal compound and/or the dichroic dye is homeotropically aligned due to the application of a voltage, the thickness-direction retardation ($R_{th}$) of the liquid crystal cell may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more or 140 nm or more. In addition, when a voltage is applied, the thickness-direction retardation ($R_{th}$) of the liquid crystal cell may be approximately 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less or 160 nm or less.

The term "in-plane retardation ($R_{in}$)" as used herein may refer to a value calculated by Equation 1, and the term "thickness-direction retardation ($R_{th}$)" as used herein may refer to a value calculated by Equation 2.

$$R_{in} = (n_x - n_y) \times d \qquad \text{[Equation 1]}$$

$$R_{th} = (n_z - n_y) \times d \qquad \text{[Equation 2]}$$

In Equations 1 and 2, the marks "$n_x$, $n_y$, $n_z$ and d" refer to a refractive index of an in-plane slow axis direction, a refractive index of an in-plane fast axis direction, a refractive index in a thickness direction and a thickness of a liquid crystal layer of the liquid crystal cell, respectively. Each refractive index may be a refractive index, for example, measured with respect to light having a wavelength of 550 nm.

Accordingly, a device, which has a wide viewing angle when a voltage is not applied, and a narrow viewing angle when a voltage is applied, may be realized.

The alignment state of the liquid crystal compound and/or the dichroic dye in the liquid crystal cell when a voltage is applied or not applied and the retardation according to the state may be freely controlled to suitably control the viewing angle and/or light transmittance according to a kind of the display element to which the liquid crystal cell is applied.

The liquid crystal cell may include, for example, a polymer network and the liquid crystal region including a liquid crystal compound and a dichroic dye as the liquid crystal region dispersed in the polymer network. The term "liquid crystal region" as used herein may refer to a region including a liquid crystal compound and a dichroic dye. The region may be phase-separated from and dispersed in the network. FIG. 2 shows a schematic of an illustrative liquid crystal cell, which includes a polymer network 1011 and a liquid crystal region 1012. In FIG. 2, an arrow in the liquid crystal region 1012 represents a liquid crystal compound, and an oval represents a dichroic dye.

In the liquid crystal cell, the polymer network and the liquid crystal compound in the liquid crystal region may satisfy Equation 3.

$$(1-a)\times\{(2n_o^2+n_e^2)/3\}^{0.5} < n_p < (1+a)\times\{(2n_o^2+n_e^2)/3\}^{0.5}$$ [Equation 3]

In Equation 3, $n_p$ is a refractive index of the polymer network, $n_o$ is an ordinary refractive index of the liquid crystal compound, $n_e$ is an extraordinary refractive index of the liquid crystal compound, and a is a number satisfying $0 \le a < 0.5$.

In this document, the refractive index applied to the above Equation may be, for example, a refractive index measured with respect to light having a wavelength of 550 nm. In addition, when ordinary and extraordinary refractive indexes of the polymer network are different from each other, the refractive index of the polymer network in Equation 3 may be an ordinary refractive index of the network. As the polymer network and the liquid crystal compound are selected to satisfy Equation 3, an element having excellent transparency and contrast ratio may be provided, even when a voltage is not applied.

In Equation 3, the "a" may be, for example, less than 0.4, less than 0.3, less than 0.2 or less than 0.1, or substantially equal to 0.

A dielectric anisotropy of the polymer network may be 3 or more, 3.5 or more or 4 or more. In this range of the dielectric anisotropy, a drive voltage property of the liquid crystal cell may be excellently maintained. The upper limit of the dielectric anisotropy may be, but is not particularly limited to, for example, approximately 20 or less, 15 or less, or 10 or less.

The liquid crystal region in the polymer network includes a liquid crystal compound. As the liquid crystal compound, all kinds of compounds which may be phase-separated in the polymer network and aligned by the polymer network may be used. For example, as the liquid crystal compound, a smectic liquid crystal compound, a nematic liquid crystal compound or a cholesteric liquid crystal compound may be used. The liquid crystal compound may be phase-separated and thus not bound to the polymer network, and when a voltage is applied from an external environment, the alignment may be changed. To this end, for example, the liquid crystal compound may be a compound which does not have a polymerizable or crosslinkable group.

In one embodiment, as the liquid crystal compound, a nematic liquid crystal compound may be used. As the compound, for example, a nematic liquid crystal compound satisfying Equation 4 may be used.

$$(1.53-b) < \{(2n_o^2+n_e^2)/3\}^{0.5} < (1.53+b)$$ [Equation 4]

In Equation 4, $n_o$ is an ordinary refractive index of the liquid crystal compound as defined in Equation 3, for example, a refractive index in a shorter axis direction of the nematic liquid crystal compound, $n_e$ is an extraordinary refractive index of the liquid crystal compound as defined in Equation 3, for example, a refractive index in a longer axis direction of the nematic liquid crystal compound, and b is a number satisfying $0.1 \le b \le 1$.

A liquid crystal cell ensuring excellent transparency may be manufactured by selecting the liquid crystal compound satisfying Equation 4 even when a voltage is not applied.

In Equation 4, in another embodiment, the "b" may be 0.1 to 0.9, 0.1 to 0.7, 0.1 to 0.5 or 0.1 to 0.3.

In addition, a difference between an extraordinary dielectric anisotropy ($\epsilon_e$, dielectric anisotropy in a major axis direction) of the liquid crystal compound and an ordinary dielectric anisotropy ($\epsilon_o$, dielectric anisotropy in a minor axis direction) of the liquid crystal compound may be 3 or more, 3.5 or more, 4 or more, 6 or more, 8 or more or 10 or more. When the liquid crystal compound has such dielectric anisotropy, an element having an excellent drive voltage property may be provided. As the difference in dielectric anisotropy is large, the element may exhibit suitable characteristics, and therefore the upper limit thereof is not particularly limited. For example, as the liquid crystal compound, a compound having an extraordinary dielectric anisotropy ($\epsilon_e$) of approximately 6 to 50, and an ordinary dielectric anisotropy ($\epsilon_o$) of approximately 2.5 to 7 may be used.

The liquid crystal region also includes a dichroic dye. The term "dye" as used herein may refer to a material capable of intensively absorbing and/or changing light in a visible region, for example, in at least a part of or entire wavelength range of 400 to 700 nm, and the term "dichroic dye" as used herein may refer to a material capable of anisotropically absorbing light in at least a part of or entire range of the visible region. By using the dye, when the liquid crystal cell is applied to the display device, a color sense of the device may be controlled. As the dichroic dye, not particularly limited to, for example, a black dye may be used. The dichroic dye may use a dye having a dichroic ratio, that is, a value obtained by dividing absorption of polarized light parallel to the major axis direction of the dichroic dye by absorption of polarized light parallel to a direction perpendicular to the major axis direction of 5 or more, 6 or more or 7 or more. The dye may satisfy the dichroic ratio within the wavelength range of the visible region, for example, at least a part of or one wavelength in the wavelength range of approximately 380 to 700 or 400 to 700 nm. The upper limit of the dichroic ratio may be, for example, approximately 20, 18, 16, or 14. A kind of the dichroic dye is not particularly limited, and thus, for example, all known kinds of dyes having the above-described characteristics and capable of being aligned according to the alignment of the liquid crystal compound may be used.

The liquid crystal cell may exhibit excellent transparency, for example, even when a voltage is not applied. For example, the liquid crystal cell may have a light transmittance of 80% or more, 85% or more, 90% or more, or 95% or more, when a voltage is not applied. The light transmittance may be a light transmittance in the visible region, for example, in a wavelength range of approximately 400 to 700 nm.

In one embodiment, the polymer network may be an alignable network of a precursor including an alignable compound. The term "alignable network of a precursor including an alignable compound" may refer to, for example, a polymer network including a precursor having an alignable compound or a polymer network including the crosslinked or polymerized product of the precursor.

The term "alignable compound" as used herein may refer to, for example, a compound which is capable of being orientationally ordered in a predetermined direction by, for example, irradiation of light, and aligning an adjacent liquid crystal compound in a predetermined direction through interaction such as anisotropic interaction in the ordered state as described above. The compound may be a unimolecular compound, a monomeric compound, an oligomeric compound, or a polymeric compound. As the alignable compound, for example, a photo-alignable compound may be used. The photo-alignable compound may refer to a compound which is capable of being orientationally ordered in a predetermined direction by radiation of light, for example, linearly polarized light, and then inducing alignment of the adjacent liquid crystal compound.

The photo-alignable compound may be a compound including a photosensitive moiety. Various photo-alignable compounds used to align the liquid crystal compound are known. As the photo-alignable compound, for example, a compound aligned by trans-cis photoisomerization; a compound ordered by chain scission or photo-destruction such as photo-oxidation; a compound ordered by photocrosslinking such as [2+2] cycloaddition, [4+4] cycloaddition or photo-dimerization or photopolymerization; a compound ordered by photo-Fries rearrangement or a compound ordered by ring opening/closure may be used. As the compound ordered by trans-cis photoisomerization, for example, an azo compound such as a sulfonated diazo dye or an azo polymer or a stilbene may be used, and as the compound ordered by photo-destruction, cyclobutane-1,2,3,4-tetracarboxylic dianhydride, aromatic polysilane or polyester, polystyrene or polyimide may be used. In addition, as the compound ordered by photo-crosslinking or photopolymerization, a cinnamate compound, a coumarin compound, a cinnamamide compound, a tetrahydrophthalimide compound, a maleimide compound, a benzophenone compound or a diphenylacetylene compound or a compound having a chalconyl residue as a photosensitive residue (hereinafter, a chalcon compound) or a compound having an anthracenyl residue (hereinafter, an anthracenyl compound) may be used, as the compound ordered by photo-Fries rearrangement, an aromatic compound such as a benzoate compound, a benzoamide compound or a methacrylamidoaryl methacrylate compound may be used, and as the compound ordered by ring opening/closure, a compound ordered by ring opening/closure of a [4+2] π-electronic system such as a spiropyran compound may be used, but is not limited thereto.

The photo-alignable compound may be a unimolecular compound, a monomeric compound, an oligomeric compound or a polymeric compound, or a blend of the photo-alignable compound and a polymer. Here, the oligomeric or polymeric compound may have a moiety induced from the photo-alignable compound or the photosensitive moiety at a main or side chain.

As the polymer having a moiety induced from the photo-alignable compound or the photosensitive moiety, and capable of being mixed with the photo-alignable compound, polynorbornene, polyolefin, polyarylate, polyacrylate, poly(meth)acrylate, polyimide, poly(amic acid), polymaleimide, polyacrylamide, polymethacrylamide, polyvinylether, polyvinylester, polystyrene, polysiloxane, polyacrylnitrile or polymethacrylnitrile may be used, but the present application is not limited thereto.

The polymer included in the alignable compound may be, but is not limited to, representatively, polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate.

When the alignable compound is a polymeric compound, the compound may have, but is not limited to, for example, a number average molecular weight of approximately 10,000 g/mol to 500,000 g/mol.

In the alignable network, the alignable compound may be orientationally ordered, and the liquid crystal compound in the liquid crystal region may be aligned by the ordered network under a state where a voltage is not applied.

For example, the alignable compound may be simply ordered in the alignable network or may be crosslinked and/or polymerized in the ordered state, thereby forming the alignable network.

The alignable compound may include at least one crosslinkable or polymerizable functional group so that the alignable compound may be crosslinked or polymerized to form the alignable network. As the crosslinkable or polymerizable functional group, for example, a functional group reacted by application of heat or radiation of an active energy ray such as a ultraviolet ray. The functional group may be, but is not limited to, a hydroxyl group, a carboxyl group, an alkenyl group such as a vinyl group or an allyl group, an epoxy group, an oxetanyl group, a vinyl ether group, a cyano group, an acryloyl group, a methacryloyl group, an acryloyloxy group, or a methacryloyloxy group. The functional group includes, for example, a functional group capable of participating in a radical or cationic reaction by heat or radiation of an active energy ray or in a crosslinking or polymerization reaction under a base environment. The functional group may be introduced to, for example, a main or side chain of the alignable compound.

A precursor material for forming the alignable network may further include a crosslinking agent. The crosslinking agent may be added to control an afterimage or strength of the liquid crystal cell. As the crosslinking agent, for example, a compound capable of realizing a crosslinked structure by reaction with the alignable compound by application of heat or radiation of an active energy ray may be used. Various crosslinking agents capable of realizing a crosslinked structure according to a polymer compound, etc. are known. For example, the crosslinking agent may be a polyvalent compound having at least two functional groups, such as an isocyanate compound, an epoxy compound, an isothiocyanate compound, a vinyl ether compound, an alcohol, an amine compound, a thiol compound, a carboxylic acid compound, an aziridine compound or a metal chelate compound.

As the crosslinking agent capable of participating in the crosslinking reaction by radiation of an active energy ray such as a UV ray, for example, a compound including at least two of an alkenyl group such as a vinyl group or an allyl group, an epoxy group, an oxetanyl group, a vinyl ether group, an acryloyl group, a methacryloyl group, an acryloyloxy group and a methacryloyloxy group may be used. As a representative example of the compound, a multifunctional acrylate may be used. The multifunctional acrylate may be, but is not limited to, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, triglycerol di(meth)acrylate, tripropyleneglycol di(meth)acrylate, tetraethyleneglycol di(meth)acrylate, pentaerythritol di(meth)acrylate, 1,6-hexanediol di(meth)acrylate, glycerol di(meth)acrylate, tris[2-(acryloyloxy)ethyl]isocyanurate, urethane acrylate, glycerol 1,3-diglycerolate di(meth)acrylate or tri(propyleneglycol) glycerolate diacrylate.

The crosslinking agent may be included at a suitable ratio in consideration of degrees of controlling an afterimage and providing a strength, a phase separation characteristic and an anchoring characteristic between the liquid crystal region and the alignable network, photosensitivity, a dielectric anisotropy and a refractive index. For example, the precursor material for the alignable network may include the crosslinking agent in an amount of 0.1 to 100, 5 to 100, 10 to 90, 10 to 80, 10 to 70, 10 to 60 or 10 to 50 parts by weight relative to 100 parts by weight of the alignable compound. The ratio of the crosslinking agent may be changed according to kinds of the crosslinking agent and the alignable compound used. The unit "parts by weight" used herein may refer to a weight ratio between components, unless specifically defined otherwise.

The precursor material for the alignable network may further include, when necessary, a solvent, a radical or cationic initiator, a base material, another reactive compound capable of forming the network, or an additive such as a surfactant.

When the polymer network is an alignable network, in the liquid crystal cell, the liquid crystal compound in the liquid crystal region may be included in an amount of approximately 100 to 2,500, 100 to 2,000, 100 to 1,900, 100 to 1,800, 100 to 1,700, 100 to 1,600, 100 to 1,500, 100 to 1,400, 100 to 1,300, 100 to 1,200, 100 to 1,100, 100 to 1,000, 100 to 900, 100 to 800, 100 to 700, 100 to 600, 100 to 500, 100 to 400, 100 to 300 or 150 to 250 parts by weight relative to 100 parts by weight of the polymer network. The ratio of the liquid crystal compound may be changed as necessary. In addition, the dichroic dye may be included in an amount of approximately 0.01 to 5 parts by weight relative to 100 parts by weight of the liquid crystal compound, but the ratio may be changed within a suitable range as necessary.

In another embodiment, the polymer network may be a polymer network including a polymerizable liquid crystal compound. In this case, the liquid crystal cell may include an alignable layer adjacent to the liquid crystal layer. For example, the liquid crystal layer of the liquid crystal cell may be formed on one surface of the alignable layer. FIG. 3 shows a schematic of an illustrative exembodiment of a liquid crystal cell including an alignable layer 301 and a liquid crystal layer, which is formed on one surface of the alignable layer 301 and includes a polymer network 1011 and a liquid crystal region 1012. In FIG. 3, a liquid crystal compound in the liquid crystal region 1012 is represented as an arrow, and a dichroic dye is represented as an oval.

In the liquid crystal layer, the polymerizable liquid crystal compound forming the polymer network and/or the liquid crystal compound in the liquid crystal region may be ordered by the alignable layer. Such a liquid crystal cell may exhibit excellent transparency, for example, even when a voltage is not applied.

In the liquid crystal cell, as the alignable layer, for example, an alignable layer including a photo-alignable compound may be used. As the photo-alignable compound, for example, a suitable kind of compound used to form the alignable network may be used. In the alignable layer, the photo-alignable compound may be orientationally ordered.

The alignable layer may further include a reactive compound, for example, a compound having at least one functional group capable of reacting with the photo-alignable compound. The reactive compound may include, for example, at least two, particularly, 2 to 10, 4 to 10 or 4 to 8 functional groups. The functional group may have reactivity to the polymer network of the liquid crystal layer or the precursor material for forming the network. The reactive compound may induce an additional reaction, separate from a reaction, for example, a photocrosslinking or photopolymerization reaction, performed such that a photo-alignable compound in a mixture exhibits a liquid crystal alignment property during radiation of light to the mixture to form the alignable layer or radiation of light to form the liquid crystal layer. The additional reaction may be a crosslinking reaction between photo-alignable compounds, or a crosslinking reaction between a photo-alignable compound and a reactive compound or between a polymer network and a reactive compound. Thus, the reactive compound may be included in the alignable layer by reaction with the photo-alignable compound or the polymer network.

The functional group capable of reacting with the photo-alignable compound and/or polymer network may be, for example, a functional group including an ethylene-like unsaturated double bond, which may be crosslinked with the photo-alignable compound and/or polymer network by a free radical reaction. Specifically, the functional group may be one or at least two of an alkenyl group, an epoxy group, a cyano group, a carboxyl group, an acryloyl group and a methacryloyl group.

The reactive compound may include at least 1 or 2, or 2 to 10, 4 to 10 or 4 to 8 functional groups, and have a molecular weight or weight average molecular weight of 200 to 5,000 or 200 to 1,000. In the ranges of the number, molecular weight or weight average molecular weight of the functional groups, the compound may maintain liquid crystal alignability of the photo-alignable compound and suitably maintain the additional reaction, thereby improving durability of the liquid crystal cell.

The reactive compound may be, but is not limited to, alkyl (meth)acrylate such as methyl (meth)acrylate, ethyl (meth)acrylate, N,N-dimethylaminoethyl (meth)acrylate or 2-(2-oxo-imidazolidinyl)ethyl (meth)acrylate; hydroxyalkyl (meth)acrylate such as hydroxyethyl (meth)acrylate or hydroxypropyl (meth)acrylate; alkoxyalkyl (meth)acrylate such as methoxyethyl (meth)acrylate; carboxyalkyl (meth)acrylate such as carboxyethyl (meth)acrylate; a multifunctional acrylate such as trimethylolpropane tri(meth)acrylate, pentaerythritol(pentaerythritol) tri(meth)acrylate, pentaerythritol tetra(meth)acrylate, dipentaerythritol penta(meth)acrylate, dipentaerythritol hexa(meth)acrylate, triglycerol di(meth)acrylate, tripropyleneglycol di(meth)acrylate, tetraethyleneglycol di(meth)acrylate, pentaerythritol di(meth)acrylate, 1,6-hexanediol di(meth)acrylate, glycerol di(meth)acrylate, tris[2-(acryloyloxy)ethyl]isocyanurate, urethane acrylate, glycerol 1,3-diglycerolate di(meth)acrylate or tri(propyleneglycol) glycerolate diacrylate; alkenyl (meth)acrylate such as vinyl (meth)acrylate or allyl (meth)acrylate; alkoxy polyalkyleneglycol (meth)acrylate such as butoxy triethyleneglycol (meth)acrylate; succinic acid acryloyloxyalkyl ester such as mono-2-(acryloyloxy)ethyl succinate; (meth)acryloyloxyalkyl (meth)acrylate such as 3-(acryloyloxy)-2-hydroxypropyl (meth)acrylate; (meth)acrylamide or a derivative thereof such as (meth)acrylamide, diacetone (meth)acrylamide, N-[tris(hydroxymethyl)methyl]acrylamide, N,N-(1,2-dihydroxyethylene)bisacrylamide or N,N-methylenebis(acrylamide); acetamidoacrylic acid alkyl ester such as methyl 2-acetamidoacrylate; a triazine substituted with a (meth)acryloyl group or an alkenyl group such as 1,3,5-triacryloylhexahydro-1,3,5-triazine or 2,4,6-triallyloxy-1,3,5-triazine; an isocyanurate substituted with an epoxy group such as tris(2,3-epoxypropyl) isocyanurate; tetracyanoalkylene oxide such as tetracyanoethylene oxide, carboxylate substituted with an alkenyl group such as triallylbenzenetricarboxylate; caprolactone (meth)acryloyloxyalkyl ester such as caprolactone 2-((meth)acryloyloxy)ethyl ester; maleic acid (meth)acryloyloxyalkyl ester such as mono-2-((meth)acryloyloxy)ethyl malate; a polyvalent carboxylic acid such as 1,2,3-triazole-4,5-dicarboxylic acid; an alkanediol substituted with an alkenyl group such as 3-allyloxy-1,2-propanediol; an alkane substituted with a glycidyloxyphenyl group such as bis[4-(glycidyloxy)phenyl]methane; a dioxalene compound substituted with an alkenyl group such as 2-vinyl-1,3-dioxalane; or poly(melamine-co-formaldehyde). The term "(meth)acryl" used herein refers to acryl or methacryl.

The alignable layer may include the reactive compound, for example, in an amount of 10 to 1,000 or 25 to 400 parts by weight relative to 100 parts by weight of the photo-alignable compound. In this ratio, an adhesive strength to the base layer or polymer network and an alignment property may be excellently maintained.

The precursor material for forming the alignable layer may further include a photoinitiator in addition to the photo-alignable compound. As the photoinitiator, for example, any one capable of inducing a free radical reaction by radiation of light may be used without particular limitation. Such a photoinitiator may be an alpha-hydroxy ketone compound, an alpha-amino ketone compound, a phenyl glycoxylate compound or an oxime ester compound, and particularly, an oxime ester compound. A ratio of the photoinitiator in the precursor material is not particularly limited, but the photoinitiator is necessarily included at an amount of inducing a suitable reaction.

When a polymerizable liquid crystal compound is included, the polymer network may be, for example, a network of a precursor material including a polymerizable liquid crystal compound. The term "network of a precursor material including a polymerizable liquid crystal compound" may refer to, for example, a polymer network including a crosslinked or polymerized polymerizable liquid crystal compound. The term "polymerizable liquid crystal compound" may refer to a compound including a part capable of exhibiting liquid crystallinity, for example, a mesogen backbone, and at least one polymerizable functional group. In addition, a backbone such as a main or side chain of a liquid crystal polymer in the polymer network may be formed by polymerizing the polymerizable liquid crystal compound.

The polymerizable liquid crystal compound may be a multifunctional polymerizable liquid crystal compound, a monofunctional polymerizable liquid crystal compound or a mixture thereof. The term "multifunctional polymerizable liquid crystal compound" may refer to a compound including at least two, particularly, 2 to 10, 2 to 8, 2 to 6, 2 to 5, 2 to 4, 2 to 3 or 2 polymerizable functional groups of the liquid crystal compound, and the term "monofunctional polymerizable liquid crystal compound" may refer to a compound including one polymerizable functional group of the liquid crystal compound.

The polymerizable liquid crystal compound may be, for example, a compound represented by Formula 1.

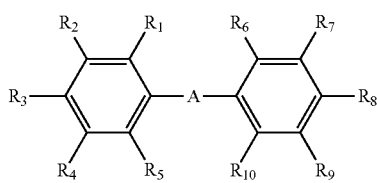

[Formula 1]

In Formula 1, A may be a single bond, —COO— or —OCO—, and $R_1$ to $R_{10}$ may be each independently hydrogen, halogen, an alkyl group, an alkoxy group, an alkoxycarbonyl group, a cyano group, a nitro group, —O-Q-P or a substituent of Formula 2. In the above, a pair of two adjacent substituents of $R_1$ to $R_5$ or a pair of two adjacent substituents of $R_6$ to $R_{10}$ may be linked to each other so as to form a benzene substituted with —O-Q-P. In the above, at least one of $R_1$ to $R_{10}$ is —O-Q-P or the substituent of Formula 2, or at least one pair of the two adjacent substituents of $R_1$ to $R_5$ and two adjacent substituents of $R_6$ to $R_{10}$ are linked to each other so as to form the benzene substituted with —O-Q-P. In the above, Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

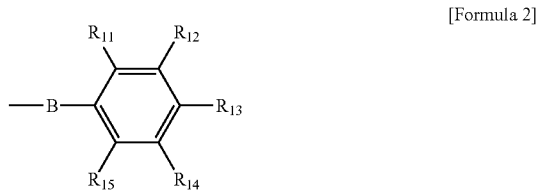

[Formula 2]

In Formula 2, B may be a single bond, —COO— or —OCO—, and $R_{11}$ to $R_{15}$ may be each independently hydrogen, halogen, an alkyl group, an alkoxy group, an alkoxycarbonyl group, a cyano group, a nitro group, or —O-Q-P. In the above, a pair of two adjacent substituents of $R_{11}$ to $R_{15}$ may be linked to each other so as to form a benzene substituted with —O-Q-P. In the above, at least one of $R_{11}$ to $R_{15}$ is —O-Q-P, or a pair of two adjacent substituents of $R_{11}$ to $R_{15}$ are linked to each other so as to form the benzene substituted with —O-Q-P. In the above, Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the term "two adjacent substituents being linked to each other so as to form the benzene substituted with —O-Q-P" may refer to a state where the two adjacent substituents are linked to each other, thereby forming a naphthalene backbone substituted with —O-Q-P.

In Formula 2, the mark "—" on the left of B may refer that B is directly linked to the benzene of Formula 1.

In Formulas 1 and 2, the term "single bond" refers to the case in which any atom is not in a site represented as the "A" or "B." For example, in Formula 1, when A is a single bond, benzenes at both sides of A may be directly linked, thereby forming a biphenyl structure.

In Formulas 1 and 2, as halogen, for example, chlorine, bromine or iodine may be used.

The term "alkyl group" may refer to, unless specifically defined otherwise, for example, a linear or branched alkyl group having 1 to 20, 1 to 16, 1 to 12, 1 to 8 or 1 to 4 carbon atoms, or for example, a cycloalkyl group having 3 to 20, 3 to 16 or 4 to 12 carbon atoms. The alkyl group may be optionally substituted with at least one substituent.

The term "alkoxy group" may refer to, unless specifically defined otherwise, for example, an alkoxy group having 1 to 20, 1 to 16, 1 to 12, 1 to 8 or 1 to 4 carbon atoms. The alkoxy group may be a linear, branched or cyclic type. In addition, the alkoxy group may be optionally substituted with at least one substituent.

The term "alkylene group" or "alkylidene group" may refer to, unless specifically defined otherwise, for example, an alkylene or alkylidene group having 1 to 12, 4 to 10 or 6 to 9 carbon atoms. The alkylene or alkylidene group may be, for example, a linear, branched or cyclic type. In addition, the alkylene or alkylidene group may be optionally substituted with at least one substituent.

The term "alkenyl group" may refer to, unless specifically defined otherwise, for example, an alkenyl group having 2 to 20, 2 to 16, 2 o 12, 2 to 8 or 2 to 4 carbon atoms. The alkenyl group may be, for example, a linear, branched or cyclic type. In addition, the alkenyl group may be optionally substituted with at least one substituent.

In Formulas 1 and 2, P may be, for example, an acryloyl group, a methacryloyl group, an acryloyloxy group or a methacryloyloxy group; an acryloyloxy group or a methacryloyloxy group; or an acryloyloxy group.

In the specification, a substituent capable of being substituted to a specific functional group may be, but is not limited to, an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group.

In Formulas 1 and 2, the at least one —O-Q-P or the moiety of Formula 2 may be at a position of, for example, $R_3$, $R_8$ or $R_{13}$. In addition, the substituents linked to each other to constitute the benzene substituted with —O-Q-P may be, for example, $R_3$ and $R_4$ or $R_{12}$ and $R_{13}$. In addition, in the compound of Formula 1 or the moiety of Formula 2, the substituents, other than the —O-Q-P or the moiety of Formula 2 or those linked to each other to form the benzene, may be, for example, hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group or a nitro group, and in another embodiment, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms or a cyano group.

The precursor material for the polymer network may further include, when necessary, a solvent, a radical or cationic initiator capable of inducing polymerization of the polymerizable liquid crystal compound, a base material, another reactive compound capable of forming the network or an additive such as a surfactant.

When the polymer network of the polymerizable liquid crystal compound is included, a ratio of the polymer network of the liquid crystal layer of the liquid crystal cell may be approximately 0.5 to 200, 0.5 to 150, 0.5 to 100, 1 to 100, 5 to 100, 5 to 80, 5 to 60 or 5 to 40 parts by weight relative to 100 parts by weight of the liquid crystal compound in the liquid crystal region. The ratio may be changed as necessary. In addition, the dichroic dye may be included at approximately 0.01 to 5 parts by weight relative to 100 parts by weight of the liquid crystal compound, but the ratio may be changed within a suitable range as necessary.

The liquid crystal cell may further include one or at least two base layers. The liquid crystal layer may be formed on a surface of the base layer, or between two or more base layers. For example, the liquid crystal cell may further include base layers facing each other, and may be present between the facing base layers. FIG. 4 shows an exemplary liquid crystal cell including a liquid crystal layer, which is present between base layers 401A and 401B spaced a predetermined distance apart and facing each other and includes a polymer network 1011 and a liquid crystal region 1012. In FIG. 4, a liquid crystal compound is represented as an arrow in the liquid crystal region 1012, and the dichroic dye is represented as an oval.

As the base layer, any one of the known materials, for example, an inorganic film such as a glass film, a crystalline or non-crystalline silicon film, a quartz or indium tin oxide (ITO) film, or a plastic film may be used without particular limitation. As the base layer, an optically isotropic base layer, an optically anisotropic base layer such as a retardation layer, a polarizing plate or a color filter substrate may be used.

The plastic base layer may be, but is not limited to, a base layer including TAC(triacetyl cellulose); a cyclo olefin copolymer (COP) of a norbornene derivative; poly(methyl methacrylate) (PMMA); polycarbonate (PC); polyethylene (PE); polypropylene (PP); polyvinyl alcohol (PVA); diacetyl cellulose (DAC); Polyacrylate (Pac); poly ether sulfone (PES); polyetheretherketon (PEEK); polyphenylsulfone (PPS), polyetherimide (PEI); polyethylenemaphthatlate (PEN); polyethyleneterephtalate (PET); polyimide (PI); polysulfone (PSF); polyarylate (PAR), or a non-crystalline fluorine resin. In the base layer, when necessary, gold, silver, a coating layer of a silicon compound such as silicon dioxide or silicon monoxide, or a coating layer such as an anti-reflection layer may be included.

An electrode layer may be included on a surface of the base layer, for example, a surface of the base layer on the side of the liquid crystal layer (e.g., a surface of the base layer 401A or 401B in contact with the liquid crystal layer in FIG. 4). The electrode layer may be formed by depositing, for example, a conductive polymer, a conductive metal, a conductive nanowire, or a metal oxide such as ITO. The electrode layer may be formed to have transparency. In the related art, various materials and methods of forming a transparent electrode layer are known, and any of the methods may be used. When necessary, the electrode layer formed on the surface of the base layer may be suitably patterned.

The liquid crystal cell may also include a polarizing plate disposed on one surface of the liquid crystal layer. FIG. 5 shows an exemplary liquid crystal cell having a polarizing plate 501 disposed on one surface thereof. In FIG. 5, a liquid crystal compound is represented as an arrow in a liquid crystal region 1012, and a dichroic dye is represented as an oval. In FIG. 5, while the polarizing plate 501 is disposed in contact with the liquid crystal layer, for example, the above-described base layer and/or electrode layer may be present between the polarizing plate 501 and the liquid crystal layer as necessary. The polarizing plate may be, but is not particularly limited to, an absorption-type polarizing plate such as a known polyvinylalcohol polarizing plate. For example, when a voltage is not applied, an alignment direction of the homogeneously aligned liquid crystal compound and/or dichroic dye may be substantially parallel to a light absorption axis of the polarizing plate.

The present application also relates to a display device including the liquid crystal cell. As described above, the display device may include a display element and a liquid crystal cell. In addition, the liquid crystal cell may be disposed on one surface of the display element, for example, the outmost surface of the display device. The display element may include at least one polarizing plate and a display panel, and at least one of the polarizing plates may be disposed between the display element and the liquid crystal cell. Details about the display device were described above. The display device may be manufactured by, for example, disposing the liquid crystal cell on one surface of the display element.

The present invention also relates to a method of manufacturing the liquid crystal cell.

For example, when a liquid crystal layer of the liquid crystal cell includes an alignable network, a method of manufacturing the liquid crystal cell may include radiating light to a layer of a precursor for the liquid crystal layer including the alignable network. Due to the radiation of light to the layer of the precursor, formation of the network by aligning, crosslinking and/or polymerizing an alignable compound and phase-separation of a liquid crystal compound may be induced.

The precursor may include a precursor material for the polymer network, a liquid crystal compound and a dichroic dye. The precursor material for the polymer network may include an alignable compound, for example, the photo-alignable compound. The precursor material may form the polymer network, and the liquid crystal compound and the dichroic dye may be phase-separated from the network during the formation of the network and thus form the liquid crystal region.

As the alignable compound, the above-described compound, for example, a photo-alignable compound or a precursor compound capable of forming the compound may be used, and as the liquid crystal compound and the dichroic dye, the same compounds described above may be used. The precursor material is a compound capable of forming a polymer network along with the alignable compound when necessary, and may include the suitable crosslinking agent described above. Kinds and ratios of the alignable compound, the crosslinking agent, the liquid crystal compound and the dichroic dye may be the same as described above.

In addition, the polymer network formed by the precursor material and the liquid crystal compound may satisfy Equations 3 and 4.

In the precursor, the liquid crystal compound may be included in an amount of approximately 100 to 2,500, 100 to 2,000, 100 to 1,900, 100 to 1,800, 100 to 1,700, 100 to 1,600, 100 to 1,500, 100 to 1,400, 100 to 1,300, 100 to 1,200, 100 to 1,100, 100 to 1,000, 100 to 900, 100 to 800, 100 to 700, 100 to 600, 100 to 500, 100 to 400, 100 to 300 or 150 to 250 parts by weight relative to 100 parts by weight of the precursor material, but the ratio may be suitably changed as necessary. In addition, in the precursor, the dichroic dye may be included at 0.01 to 5 parts by weight relative to 100 parts by weight of the liquid crystal compound, but the ratio may also be suitably changed as necessary.

The precursor may further include a solvent, when necessary. A suitable kind of the solvent may be selected from the known solvents, but not particularly limited to, for example, toluene, xylene, cyclopentanone and cyclohexanone.

To stimulate the reaction of forming a network of the alignable compound and/or crosslinking agent, the precursor may further include a suitable radical or cationic initiator or a catalyst such as an amine, or another reactive compound capable of forming a network or an additive such as a surfactant, when necessary.

A layer of the precursor may be formed by coating the precursor on a suitable substrate, for example, the base layer. For example, when the precursor is a liquid, the layer of the precursor may be formed by a conventional coating method such as bar coating, comma coating, inkjet coating or spin coating. On a surface of the base layer on which the layer of the precursor is formed, for example, the transparent electrode layer described above may be formed.

After the layer of the precursor is formed, light may be radiated to the layer. When the precursor includes a solvent, the radiation of light may be performed after the layer is dried under suitable conditions to volatilize the solvent. Such drying may be performed at approximately 80 to 130° C. for approximately 1 to 10 minutes, but the conditions are not limited thereto.

The radiation of light may be performed to order the alignable compound included in the layer of the precursor. Conventionally, the ordering of the alignable compound may be performed using linearly polarized light. Wavelength and intensity of the radiated light may be selected to provide suitable ordering of the alignable compound. Typically, the alignable compound, for example, the photo-alignable compound, is ordered by light in a visible or near-ultraviolet range, but light in a far-ultraviolet or near-infrared range may be used, when necessary.

The radiation of light may be performed while the liquid crystal compound is in an isotropic state. FIG. 6 is a schematic diagram illustrating a process of radiating light to a layer of a precursor 6011 including a liquid crystal compound (arrow) and a dichroic dye, which are formed on a base layer 6012 and in an isotropic state. To maintain the liquid crystal compound in an isotropic state, for example, the radiation of light may be performed at an isotropic transition temperature ($T_{NI}$) or higher of the liquid crystal compound.

According to the radiation of light, an alignable compound may be orientationally ordered, and the liquid crystal compound and/or the dichroic dye dispersed therein may be aligned in the ordering direction of the alignable compound, thereby forming a liquid crystal layer as shown in FIG. 2. When necessary, to further stimulate the formation of a polymer network, suitable application of heat or exposure may be performed before or after the process of radiating light, or simultaneously.

In another embodiment, when a polymer network of the liquid crystal layer includes a polymerizable liquid crystal compound, the liquid crystal cell may be manufactured by, for example, a method including radiating light to a layer of a precursor for the liquid crystal layer formed on the alignable layer. When the light is radiated to the layer of a precursor, for example, the polymerizable liquid crystal compound may be polymerized, thereby forming the polymer network, and the polymer network of the liquid crystal compound may be phase-separated, thereby forming a liquid crystal region.

For example, the alignable layer may be formed by coating an alignable layer precursor including the photo-alignable compound on a suitable substrate, for example, the base layer, and ordering the photo-alignable compound by exposure. FIG. 7 is a schematic diagram of a process of forming an alignable layer 7011 by radiating light to a precursor for the alignable layer formed on a base layer 7012.

The precursor for the alignable layer may further include, for example, a suitable amount of the above-described reactive compound or initiator, in addition to the photo-alignable compound, and include another additive such as a surfactant, when necessary. The layer of the precursor for the alignable layer may be formed by coating the precursor using a conventional coating method, for example, bar coating, comma coating, inkjet coating or spin coating. On a surface of the base layer on which the layer of the precursor is formed, for example, the above-described transparent electrode layer may be formed.

After the layer of the precursor is formed, light may be radiated to the layer. When the precursor includes a solvent, the radiation of light may be performed after the layer is dried under suitable conditions to volatilize the solvent. Such drying may be performed at approximately 60 to 130° C. for approximately 1 to 5 minutes, but the conditions are not limited thereto.

The radiation of light may be performed to order an alignable compound included in the layer of the precursor. Conventionally, the ordering of the alignable compound may be performed using linearly polarized light. Wavelength and intensity of the radiated light may be selected to provide suitable ordering of the alignable compound. Typically, the alignable compound, for example, the photo-alignable compound, is ordered by light in a visible or near-ultraviolet range, but light in a far-ultraviolet or near-infrared range may be used, when necessary.

After the alignable layer is formed, the layer of the precursor for the liquid crystal layer may be formed adjacent to the alignable layer. FIG. 8 is schematic diagram of a process of forming a liquid crystal layer including a polymer network 1011 and a liquid crystal region 1012 by radiating light to a precursor for the liquid crystal layer formed on a surface of the alignable layer 7011 formed in FIG. 7.

The precursor for the liquid crystal layer may be prepared by dissolving, for example, the above-described polymerizable liquid crystal compound, a liquid crystal compound forming a liquid crystal region, a dichroic dye and other necessary additives (e.g., an initiator, etc.) in a suitable solvent. As a solvent, a known solvent such as toluene, xylene, cyclopentanone or cyclohexanone may be used. The precursor for the liquid crystal layer may include, for example, 1 to 60 parts by weight of the polymerizable liquid crystal compound, 40 to 100 parts by weight of the liquid crystal compound, 5 to 50 parts by weight of the polymerizable liquid crystal compound, and 5 to 95 parts by weight of the liquid crystal compound, which however may be changed as necessary. In addition, the dichroic dye may be included in the precursor at approximately 0.01 to 5 parts by weight relative to 100 parts by weight of the liquid crystal compound, but the ratio may be changed within a suitable range as necessary.

After the layer of the precursor is formed, light may be radiated to the layer. When the precursor includes a solvent, the radiation of light may be performed after the layer is dried under suitable conditions to volatilize the solvent. The radiation of light may also be performed while the liquid crystal compound is aligned by an adjacent alignable layer. Such drying and/or alignment of the liquid crystal compound may be performed at approximately 80 to 130° C. for approximately 1 to 10 minutes, but the conditions are not limited thereto.

Conditions for radiating light are not particularly limited as long as the radiation of light is performed to form a polymer network by polymerizing the polymerizable liquid crystal compound and a liquid crystal region by phase-separating the liquid crystal compound. According to the radiation of light, the polymer network may be formed by polymerizing the polymerizable liquid crystal compound while aligned by the alignable layer, and the liquid crystal region including the liquid crystal compound may be formed. When necessary, to further stimulate the formation of the polymer network, suitable application of heat or exposure may be performed before or after the process of radiating light, or simultaneously.

After the liquid crystal layer is formed according to the above process, when necessary, a base layer, for example, a base layer on which a transparent electrode layer is formed, may be further attached to the liquid crystal layer.

The process of manufacturing the liquid crystal cell described above may continuously progress, for example, using a roll-to-roll method.

The liquid crystal cell formed as described above is disposed on one surface of a display element, thereby manufacturing a display device. Here, a method of disposing the liquid crystal cell on one surface of the display element is not particularly limited. For example, using a suitable pressure-sensitive adhesive or adhesive, the manufactured liquid crystal cell may be attached to a display panel or polarizing plate. The method of manufacturing the display device may further include a process of attaching the polarizing plate or a process of disposing a light source, in addition to the above-described process, and a method of performing these processes is not particularly limited, but may employ a known method.

Technical Effects

An exemplary liquid crystal cell may be applied to various types of display devices so as to control a viewing angle or light transmittance of the display device.

ILLUSTRATIVE EMBODIMENTS

Figure 1:
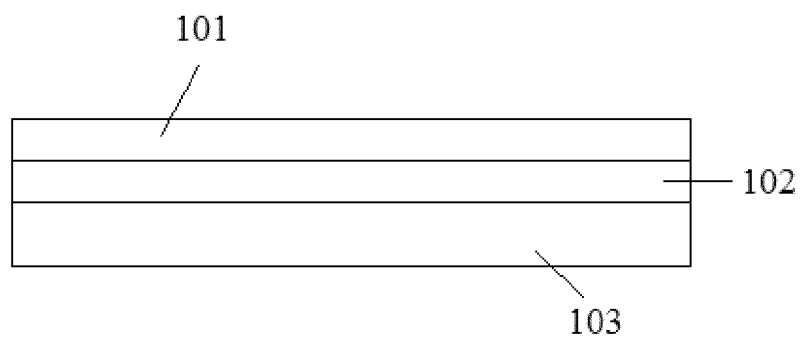
FIG. 1 shows a schematic of an illustrative embodiment of a display device.
Figure 2:
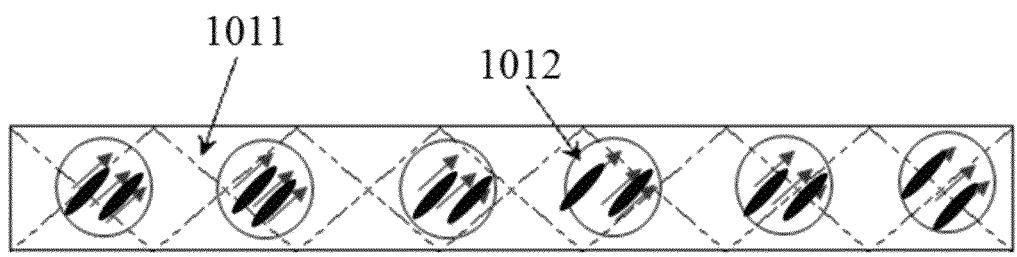
FIGS. 2 to 5 show schematics of illustrative embodiments of liquid crystal cells.
Figure 3:
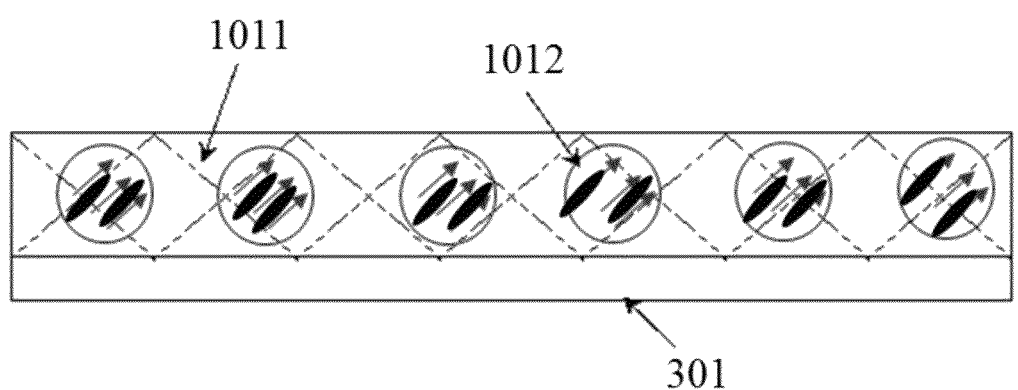
Figure 4:
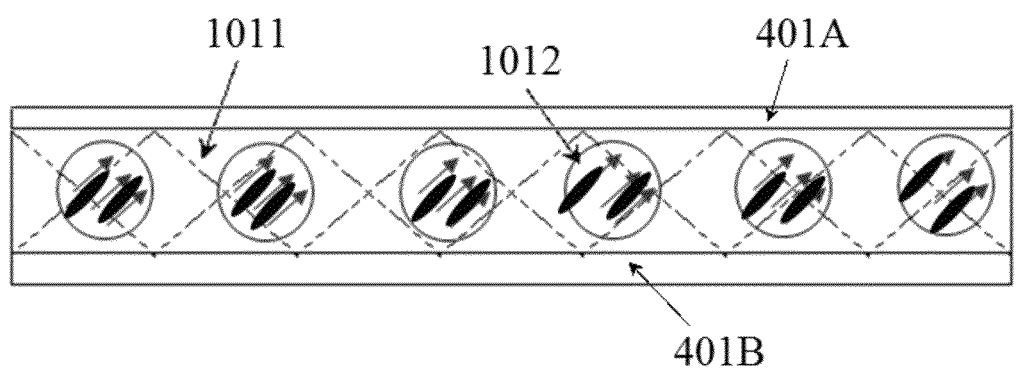
Figure 5:
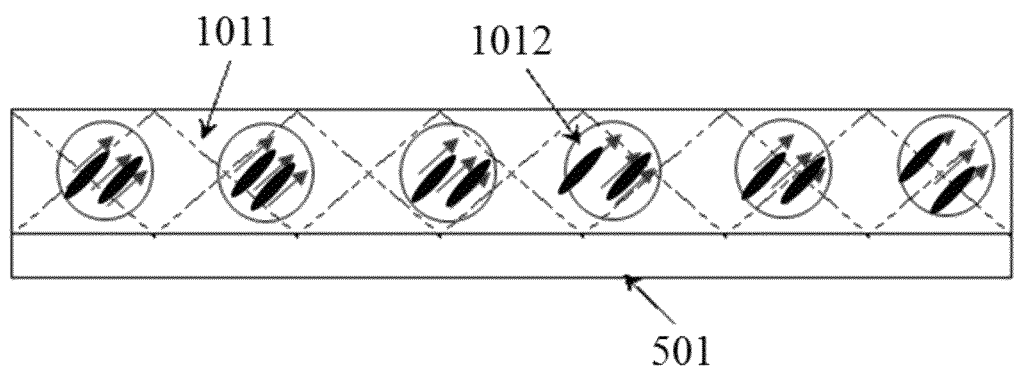
Figure 6:
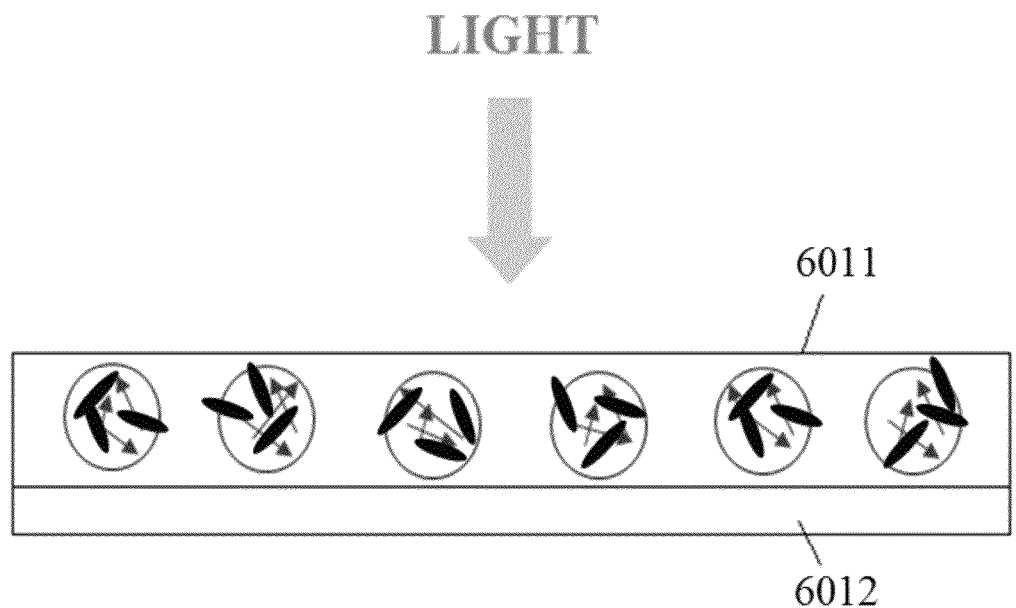
FIGS. 6 to 8 shows schematics of illustrative embodiments of manufacturing method of a liquid crystal cell.
Figure 7:
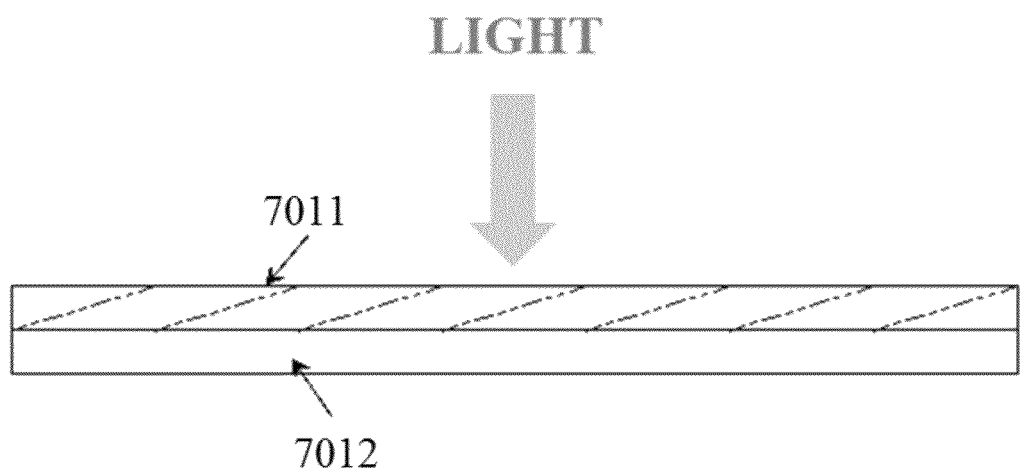
Figure 8:
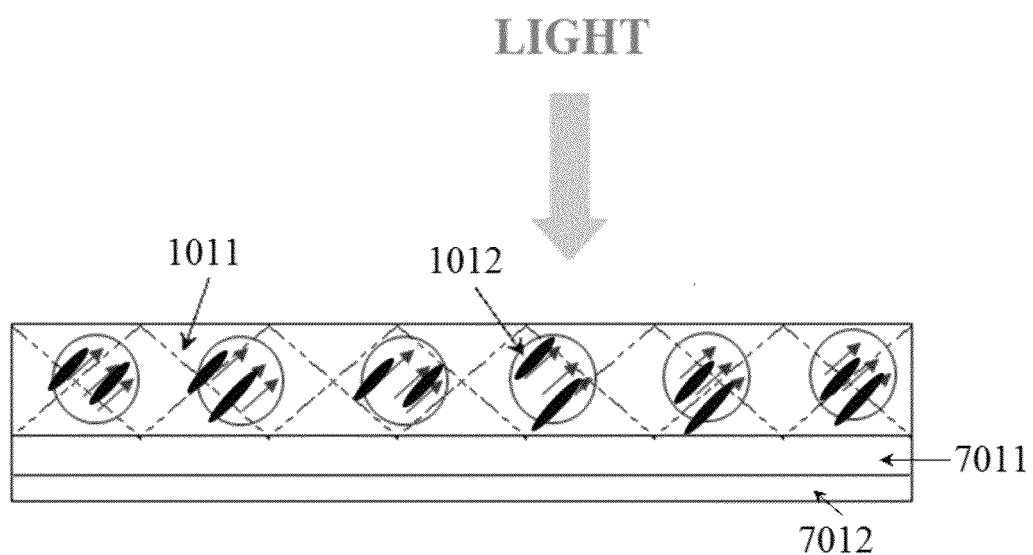

Hereinafter, a liquid crystal cell will be described in further detail with reference to Examples, but the scope of the liquid crystal cell is not limited to the following Examples.

Example 1

Formation of Alienable Layer

A precursor for an alignable layer was prepared by diluting a mixture (polynorbornene:acryl monomer:photoinitiator=2: 1:0.25(weight ratio)) including polynorbornene (PNBCi, alignable compound, weight average molecular weight of 85,000, polydispersity index (PDI): approximately 4.75) including a repeating unit of Formula 3, an acryl monomer and a photoinitiator (Igacure 907) with a toluene so as to have a solid content of 2 weight %. Subsequently, the precursor was coated on an electrode layer of a polycarbonate film on one surface of which an ITO electrode layer was formed, and a linearly polarized ultraviolet ray (1,200 mJ/cm$^2$) was radiated by means of a wire grid polarizer (WGP), thereby forming an alignable layer.

[Formula 3]

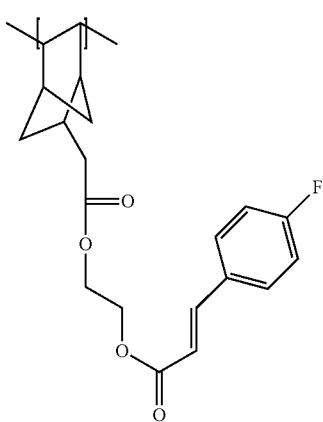

Manufacture of Liquid Crystal Cell

A polymerizable liquid crystal compound (RM257, Merck) of Formula 4 and a liquid crystal compound (ZGS-8017, JNC, ordinary refractive index: 1.487, extraordinary refractive index: 1.597) for forming a liquid crystal region were mixed in a weight ratio of 1:5. Subsequently, dyes having trade names of AB3 (Nematel, Germany, dichroic ratio with respect to light having a wavelength of 643 nm: 12.8), AG1 (Nematel, Germany, dichroic ratio with respect to light having a wavelength of 463 nm: 11.7), AR1 (Nematel, Germany, dichroic ratio with respect to light having a wavelength of 554 nm: 11.0) and AC1 (Nematel, Germany, dichroic ratio with respect to light having a wavelength of 668 nm: 12.1), respectively, were mixed as dichroic dyes to the mixture at 0.002946 parts by weight, 0.019028 parts by weight, 0.018738 parts by weight and 0.018110 parts by weight relative to 100 parts by weight of the mixture of the polymerizable liquid crystal compound (RM257) and the liquid crystal compound (ZGS-8017), respectively. Subsequently, based on the polymerizable liquid crystal compound, approximately 5 weight % of the photoinitiator (Igacure 907), and 0.4 weight % of a ball spacer (hypersil, diameter: approximately 2.5 nm) were sequentially added, and treated with heat at approximately 90° C. for approximately 5 minutes, thereby preparing a uniform non-solvent-type solution (precursor). Afterward, the precursor was coated on the alignable layer. Then, a sealant was formed by patterning on an edge of a base layer, another polycarbonate film having an ITO electrode layer was disposed such that the ITO electrode layer covered the layer of the precursor, and the resulting layer passed through a laminator. Subsequently, a linearly polarized ultraviolet ray (30 mW/cm$^2$) was radiated to the resulting stacked structure for approximately 20 seconds in a direction parallel to alignment axes of the polymerizable liquid crystal compound and the liquid crystal compound, thereby forming a polymer network and a liquid crystal region. A refractive index of the polymer network measured using a prism coupler was approximately 1.563.

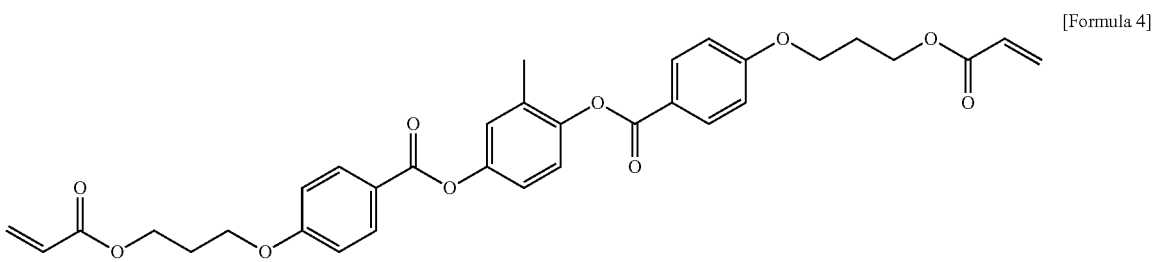 [SMILES: C=CC(=O)OCCCOc1ccc(C(=O)Oc2ccc(OC(=O)c3ccc(OCCCOC(=O)C=C)cc3)c(C)c2)cc1]

[Formula 4]

Experimental Example 1

Figure 9:
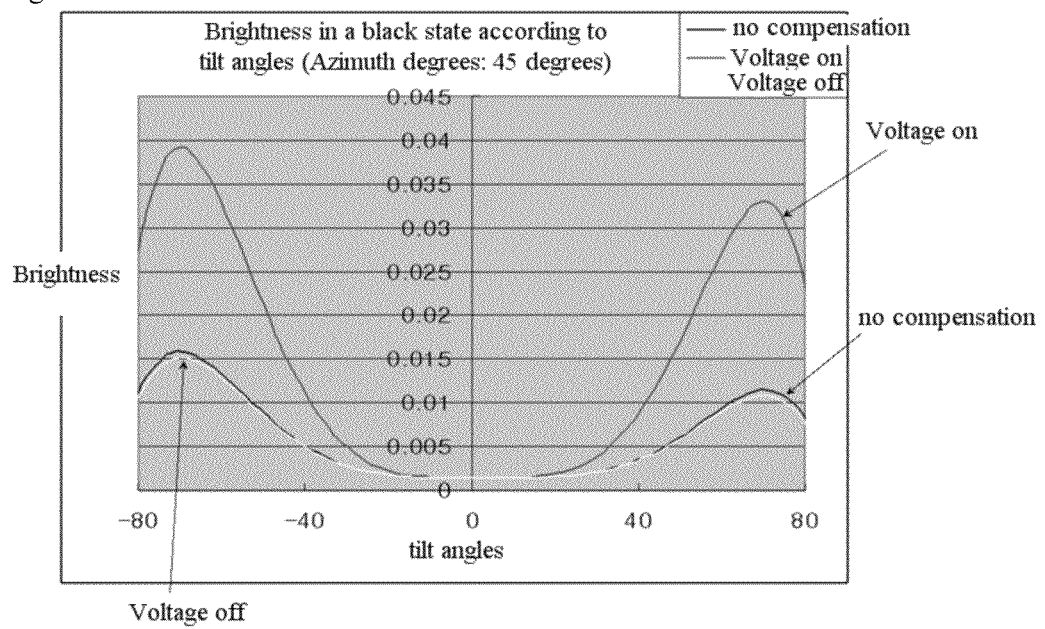
FIG. 9 shows brightness changes according to tilt angles measured at an azimuth of 45 degrees with respect to a display device to which a liquid crystal cell manufactured in Example is applied.

A viewing angle control efficiency of the liquid crystal cell manufactured in Example was measured. Specifically, while the liquid crystal cell was attached to an outside polarizing plate of a conventional in-plane switching-mode liquid crystal panel including polarizing plates disposed on both surfaces thereof, alignment directions of the liquid crystal compound and the dichroic dye in the liquid crystal region of the liquid crystal cell when a voltage was not applied were parallel to a light absorption axis of the outside polarizing plate. Afterward, during drive of the panel, a voltage was repeatedly applied and not applied. When the voltage was applied, compared to when a voltage was not applied, there was no difference in a front view, but an image turned black, and thus was not recognized in a side view. Brightness changes according to tilt angles measured at an azimuth of 45 degrees according to the above-described test were measured using an SDV-850 apparatus, and the results are shown in FIG. 9.

What is claimed is:

1. A liquid crystal cell, comprising:
   a liquid crystal layer, comprising:
   a polymer network; and
   a region which is in the polymer network including a crosslinked or polymerized product of a precursor material of the polymer network, and which comprises a liquid crystal compound which does not have a polymerizable or crosslinkable group and a dichroic dye having a dichroic ratio of 7 or more in at least a part of a wavelength range of a visible region,
   wherein the liquid crystal compound and the dichroic dye are convertible between a homogeneous alignment state and a homeotropic alignment state,
   wherein when the liquid crystal compound and the dichroic dye in the liquid crystal cell are homogeneously aligned, an in-plane retardation ($R_{in}$) of the liquid crystal cell is 10 nm or more and 300 nm or less and when the liquid crystal compound and the dichroic dye are homeotropically aligned, a thickness-direction retardation ($R_{th}$) of the liquid crystal cell is 10 nm or more and 300 nm or less.

2. The liquid crystal cell according to claim 1, wherein the polymer network and the liquid crystal compound satisfy Equation 1 below:

$$(1-a) \times \{(2n_o^2 + n_e^2)/3\}^{0.5} < n_p < (1+a) \times \{(2n_o^2 + n_e^2)/3\}^{0.5} \quad \text{[Equation 1]}$$

where $n_p$ is a refractive index of the polymer network, $n_o$ is an ordinary refractive index of the liquid crystal compound, $n_e$ is an extraordinary refractive index of the liquid crystal compound, and a is a number satisfying $0 \leq a < 0.5$.

3. The liquid crystal cell according to claim 1, wherein a dielectric anisotropy of the polymer network is 3 or more.

4. The liquid crystal cell according to claim 1, wherein the liquid crystal compound is a nematic liquid crystal compound satisfying Equation 2:

$$(1.53-b) < \{(2n_o^2 + n_e^2)/3\}^{0.5} < (1.53+b) \quad \text{[Equation 2]}$$

where $n_o$ is an ordinary refractive index of the liquid crystal compound, $n_e$ is an extraordinary refractive index of the liquid crystal compound, and b is a number satisfying $0.1 \leq b \leq 1$.

5. The liquid crystal cell according to claim 1, wherein a difference ($\epsilon_e - \epsilon_o$) between an extraordinary dielectric anisotropy ($\epsilon_e$) of the liquid crystal compound and an ordinary dielectric anisotropy ($\epsilon_o$) of the liquid crystal compound is 3 or more.

6. The liquid crystal cell according to claim 1, of which a light transmittance under a state where a voltage is not applied is 80% or more.

7. The liquid crystal cell according to claim 1, wherein the polymer network is an alignable network of a precursor material compound a photo-alignable compound.

8. The liquid crystal cell according to claim 7, wherein the photo-alignable compound is orientationally ordered, and the liquid crystal compound or the dichroic dye is aligned by the ordered network.

9. The liquid crystal cell according to claim 1, further comprising an alignable layer disposed adjacent to the liquid crystal layer, and the polymer network being a network comprising a polymerizable liquid crystal compound aligned by the alignable layer.

10. The liquid crystal cell according to claim 1, wherein the dichroic dye is a black dye.

11. The liquid crystal cell according to claim 1, further comprising two base layers disposed so as to face each other, and the liquid crystal layer being formed between the two facing base layers.

12. The liquid crystal cell according to claim 11, wherein an electrode layer is formed on the side facing the liquid crystal layer of the base layer.

13. The liquid crystal cell according to claim 1, further comprising a polarizing plate on one surface of the liquid crystal layer, and the liquid crystal compound or dichroic dye being aligned in a direction parallel to a light absorption axis of the polarizing plate under a state where a voltage is not applied.

14. A display device, comprising:
a display element; and
the liquid crystal cell of claim 1 on one surface of the display element.

15. The display device according to claim 14, wherein the display element comprises a display panel and a polarizing plate, and the polarizing plate is between the display panel and the liquid crystal cell.

16. The display device according to claim 15, wherein the display panel is an organic light emitting display panel or a liquid crystal panel.

17. A method of manufacturing a liquid crystal cell comprising:
irradiating a layer of a precursor comprising a precursor material of an alignable network comprising an alignable compound including at least one crosslinkable or polymerizable group so that the alienable compound is crosslinked or polymerized to form the alignable network, a liquid crystal compound, which does not have a polymerizable or crosslinkable group, and a dichroic dye having a dichroic ratio of 7 or more in at least a part of a wavelength range of a visible region with light,
wherein the liquid crystal cell is manufactured so that the liquid crystal compound and the dichroic dye are convertible between a homogeneous alignment state and a homeotropic alignment state,
wherein the liquid crystal cell is manufactured so that when the liquid crystal compound and the dichroic dye in the liquid crystal cell are homogeneously aligned, an in-plane retardation ($R_{in}$) of the liquid crystal cell is 10 nm or more and 300 nm or less and when the liquid crystal compound and the dichroic dye are homeotropically aligned, a thickness-direction retardation ($R_{th}$) of the liquid crystal cell is 10 nm or more and 300 nm or less.

18. A method of manufacturing a liquid crystal cell comprising:
irradiating a layer of a precursor which is formed on an alignable layer and which comprises a precursor material of a polymer network comprising a polymerizable liquid crystal compound so that the polymerizable liquid crystal compound is polymerized to form the polymer network, a liquid crystal compound, which does not have a polymerizable or crosslinkable group, and a dichroic dye having a dichroic ratio of 7 or more in at least a part of a wavelength range of a visible region with light,
wherein the liquid crystal cell is manufactured so that the liquid crystal compound and the dichroic dye are convertible between a homogeneous alignment state and a homeotropic alignment state,
wherein the liquid crystal cell is manufactured so that when the liquid crystal compound and the dichroic dye in the liquid crystal cell are homogeneously aligned, an in-plane retardation ($R_{in}$) of the liquid crystal cell is 10 nm or more and 300 nm or less and when the liquid crystal compound and the dichroic dye are homeotropically aligned, a thickness-direction retardation ($R_{th}$) of the liquid crystal cell is 10 nm or more and 300 nm or less.

* * * * *